United States Patent [19]

Pratt

[11] Patent Number: 4,979,395
[45] Date of Patent: Dec. 25, 1990

[54] APPARATUS AND METHOD OF FORMING A MAGNETIC DOMAIN STRAIN GAGE

[75] Inventor: Norman F. Pratt, Scottsdale, Ariz.

[73] Assignee: Allied-Signal Inc., Morris Township, Morris County, N.J.

[21] Appl. No.: 500,647

[22] Filed: Mar. 27, 1990

Related U.S. Application Data

[62] Division of Ser. No. 136,268, Dec. 22, 1987, Pat. No. 4,931,729.

[51] Int. Cl.$^5$ .............................................. G01B 7/24
[52] U.S. Cl. ...................................... 73/779; 324/209
[58] Field of Search .......................... 73/779; 324/209; 29/595

[56] References Cited

FOREIGN PATENT DOCUMENTS 3502008 7/1986 Fed. Rep. of Germany ........ 73/779

555276 7/1977 U.S.S.R. ................................. 73/779

Primary Examiner—Jerry W. Myracle
Attorney, Agent, or Firm—David B. Abel; Robert A. Walsh

[57] ABSTRACT

A magnetic domain strain gage and method of digitally measuring strain or fatigue within a ferromagnetic material by measuring the time required for an increasing magnetizing force to cause magnetic domains to flip orientation in a ferromagnetic material as a function of strain or stress within the material. The magnetic domain's maximum rate of flip is measured as a time differential by a high frequency digital oscillator which provides a digital signal indicative of the strain thereby providing increased compatibility with digital data acquisition systems and having a superior signal to noise ratio in comparison with present low signal level analog resistance strain gages.

11 Claims, 3 Drawing Sheets

APPARATUS AND METHOD OF FORMING A MAGNETIC DOMAIN STRAIN GAGE

This is a division of application Ser. No. 07/136268, filed Dec. 22, 1987, now U.S. Pat. No. 4,931,729.

BACKGROUND OF THE INVENTION

This invention relates to a method and apparatus for digitally measuring strain or fatigue within a ferromagnetic material. More particularly, this invention relates to a method and apparatus which measures the change in time required for the magnetic domains within a ferromagnetic material to flip orientations in response to the application of a magnetic field to the ferromagnetic material as a strain or stress is applied to the ferromagnetic material. The invention may be used as a strain gage, attached to a substrate, in order to measure strain within the substrate.

In order to determine critical design parameters within various types of test elements or components within a machine, the designer must be able to accurately measure the stress (or strain) which the component may be subjected to under operating conditions. One method of measuring stress within a component is by the attachment of a strain gage to the component surface. Once calibrated, the strain gage can be used to determine the stresses within the component when the component is subjected to a load. Another method for non-destructive direct measurement of stress within a component made up of a ferromagnetic material, is based upon the attenuation of a magnetic pulse as it traverses the component.

Present strain gages, which are adapted to be attached to a substrate, operate on the principle that when a wire or foil is stretched the electrical resistance within the wire or foil changes due to the increase in length and decrease in diameter of the wire. Thus, by measuring the change in resistance of the wire or foil and referencing this change in resistance to a calibration of the strain gage, the stress or strain within the substrate onto which the strain gage is attached may be determined. The advantages of a resistance strain gage include relatively simple design and construction and easy attachment to the surface of any type of material. However, since the resistance within the wire or foil is also a function of the temperature to which the strain gage is subjected, as well as to other environment factors, the resistance type of strain gage is temperature limited and requires a complex functional algorithm in order to determine stress or strain within a material under varied or changing environments. Additionally, resistance strain gages provide a signal which is measured as a change in resistance, thus this signal is inherently analog in nature.

The other method of measuring stress, as disclosed within Japan No. 56-101527 issued to Y. Sougiyou, measures stress applied to a body by the attenuation of a magnetic flux within a detection piece made of a magnetic elastic material which is under stress. The stress is detected as a variation in the magnitude of the magnetic flux, which is measured by the amount of current produced within a detecting coil. This method of measuring stress also provides an analog output signal.

SUMMARY OF THE INVENTION

It is an object of the present invention to provide a strain gage which operates on the principle that the time required for the magnetic domains within a ferromagnetic material to flip orientation or switch alignment is dependent upon the stress state of the ferromagnetic material thereby allowing strain to be measured as a discrete time interval by providing a digital output indicative of the strain within the substrate to which the magnetic domain strain gage is attached.

A further object of the present invention is to provide a device to measure stress within a substrate based upon the change effected upon the magnetic hysteresis property of a ferromagnetic material utilized in the device caused by stress within the ferromagnetic material.

A further object of the present invention is to provide a device which may be used to determine fatigue within a substrate based upon the change effected upon the magnetic hysteresis property of a ferromagnetic material caused by fatigue within the ferromagnetic material.

A further object of the present invention is to provide a device which may be used to measure stress or fatigue in a plurality of locations upon a substrate based upon the change effected upon the magnetic hysteresis property of a ferromagnetic material caused by stress within the ferromagnetic material.

A further object of the present invention is to provide a strain gage which can operate at elevated temperatures including temperatures approaching the Curie point of a ferromagnetic material used within the strain gage.

A further object of the present invention is to provide means of measuring stress or fatigue as a discrete change in time as measured by a high frequency digital oscillator, thus providing a signal particularly adapted for use with digital signal processing and analyzing circuitry.

A further object of the present invention is to provide a magnetic domain strain gage which may be attached directly upon a substrate.

A further object of the present invention is to provide a method of forming a magnetic domain strain gage directly upon a substrate.

The present invention provides a magnetic domain strain gage which operates on the principle that the time required for the magnetic domains to flip orientations within a ferromagnetic material, in response to a changing magnetic field or magnetic pulse within the ferromagnetic material, varies with stress or fatigue within the ferromagnetic material. In practice, the magnetic domain strain gage is connected to external electrical circuitry which includes an accurate timing apparatus, thereby, under a zero or reference stress condition, the magnetic domain flip time caused by a magnetic pulse wave traversing the ferromagnetic material may be measured as a discrete time interval, $T_o$. When stress is applied to the conductive element, the magnetic domain orientation flip time of the domains within the ferromagnetic material changes, causing a change in the measured discrete time interval to $T_l$. The difference between $T_o$ and $T_l$ is the change in magnetic domain flip time or $\Delta T$. This change in magnetic domain flip time $\Delta T$ is directly proportional to the stress within the ferromagnetic material, and thus it is also directly proportional to the stress within a substrate to which the magnetic domain strain gage is attached.

The present invention further provides a means of directly measuring fatigue. Fatigue also causes a change in the hysterisis characteristics and magnetic domain flip time within a ferromagnetic material from $T_o$ to $T_f$. The amount of this change as measured by $T_f - T_o$, yields an indication of the fatigue state of the ferromagnetic material which may be correlated to the fatigue state of a substrate to which the magnetic domain strain gage is attached.

DESCRIPTION OF THE PREFERRED EMBODIMENT

Figure 1:
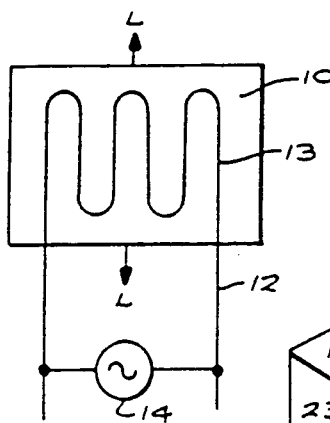
FIG. 1 is an illustration of a prior art resistance type of strain gage.

Referring now to the figures, FIG. 1 is an illustration of a common resistance type of strain gage 10, having a wire element 12 including a strain measuring section 13 adapted to be attached to the surface of a component. An ohm meter 14, connected to wire element 12 at opposite ends of strain measuring section 13, is used to measure the change in the resistance of the wire element 12 as a load L is applied. The resistance type strain gage 10 produces an analog signal output indicative of the stress within the component.

Figure 4:
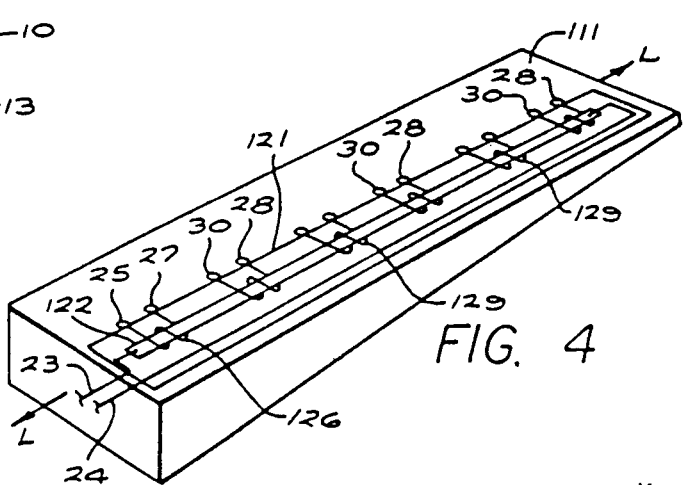
FIG. 4 is an illustration of a second alternative embodiment of a magnetic domain strain gage.
Figure 2:
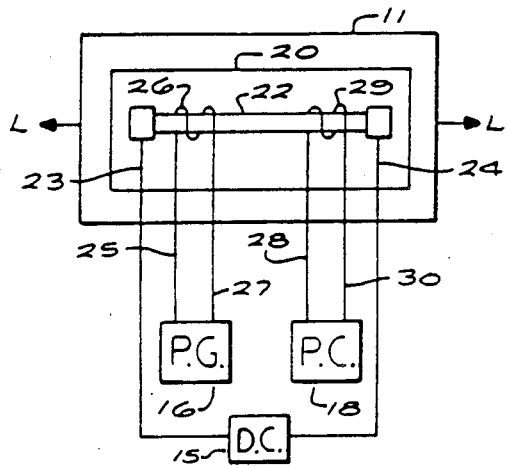
FIG. 2 is an illustration of the magnetic domain strain gage of the present invention.
Figure 3:
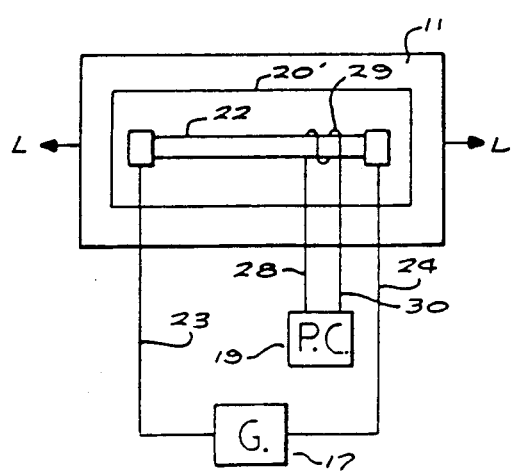
FIG. 3 is an illustration of an alternative embodiment of the magnetic domain strain gage.

By comparison, FIGS. 2 through 4 show embodiments of the magnetic domain strain gage of the present invention. Within FIGS. 2 through 4 the same numbers will be used to identify common elements. FIG. 2 shows a magnetic domain strain gage 20 attached to the surface of a substrate 11. The magnetic domain strain gage 20 includes an electrically conductive element 22, which may be for example, a wire or a ribbon of ferromagnetic material and is preferably a ribbon of amorphous metal. Wire leads 23 and 24 connect opposite ends of conductive element 22 to external circuitry. This external circuitry includes a D.C. current generating means 15 shown schematically which produces a biasing current within conductive element. A pulse coil 26 proximate to conductive element 22 and encircling conductive element 22 is connected by pulse coil leads 25 and 27 to a pulse generator 16. The pulse generator 16 routes a periodically changing electric current through pulse coil 26, causing a changing magnetic flux within conductive element 22, thereby initiating propagation of a traveling magnetic pulse wave within conductive element 22. A receiving coil 29, also proximate to the conductive element 22 and preferably encircling conductive element 22 and being spaced apart from pulse coil 26, is connected via receiving coil leads 28 and 30 to timing and processing circuitry 18, shown schematically. The timing and processing circuitry 18 is also connected to the pulse generator 16. When the pulse generator 16 couples a magnetizing force to conductive element 22 thru pulse coil 26, a digital counter within the timing and processing circuitry 18 is started. As the magnetic domains flip in conductive element 22 proximate to receiving coil 29, an electrical current is generated within receiving coil 29, due to the changing magnetic flux. This electric current in receiving coil 29 is detected by the timing and processing circuitry 18, and the digital counter is stopped. The discrete time interval captured by the digital counter provides a digital output measurement of the strain induced within substrate 11 by an applied load L.

FIG. 3 is similar to FIG. 2 and shows a magnetic domain strain gage 20' including the conductive element 22, wire leads 23 and 24, as well as the receiving coil 29 and receiving coil leads 28 and 30 connected to timing and processing circuitry 19. The differences between FIGS. 2 and 3 being that the functions of the current generator means 15, the pulse generator means 16, and pulse coil 26 of FIG. 2 have been combined into a pulse and current generator means 17 in FIG. 3. Pulse and current generator 17 provides a varying current, which may simply be an AC current, through conductive element 22 thereby also providing a changing magnetic field which causes the magnetic domains to flip in the conductive element 22. Magnetic pulses, caused by domain reversals, are detected by the receiving coil 29 and the timing and processing circuitry 18, similar to the process as detailed for FIG. 2 above.

FIG. 4 shows a magnetic domain strain gage 121 including a multiplicity of receiving coils 129 proximate to a conductive element 122. A pulse coil 126 may also be included proximate to the conductive element 122. The multiplicity of receiving coils 129 provides a number of discrete measurements of the strain within a substrate 111, for use in the case where strain varies within the substrate 111 due to loading and/or varying cross-sectional thickness of substrate 111. Thus, the magnetic domain strain gage 121 of FIG. 4 may be used to provide a complete map of the strain within substrate 111. The receiving coils 129 and the conductive element 122 may be arranged in any of a number of orientations in order to provide strain measurements along different axes.

Figure 5:
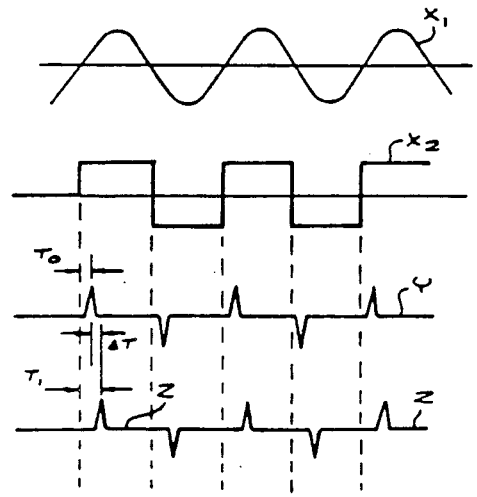
FIG. 5 is a graph illustrating the input and output pulses of the magnetic domain strain gage of FIGS. 2 or 3.

In operation, the pulse generator 16 of FIG. 2 sends an electric current pulse to pulse coil 26, thereby producing a changing magnetic field around pulse coil 26 initiating the reversal of the orientation of the magnetic domains within conductive element 22. Simultaneously with the initiation of the magnetic pulse, the digital counter within timing and processing circuitry 18 is turned on. As the magnetic domains within conductive element 22 flip proximate to the receiving coil 29, the changing magnetic field causes receiving coil 29 to produce an output current pulse. This output current pulse is sent to the timing and processing circuitry 18 and stops the digital counter. The time interval captured within the timing and processing circuitry 18 is retained and provides the digital output signal. FIG. 5 diagrammatically illustrates this sequence. The top two lines $X_1$, $X_2$ in FIG. 5 illustrates the electric current pulse or wave generated by the pulse generator 16 of FIG. 2 or the pulse or wave generating means 17 of FIG. 3 as shown. This may be either a sinusoidal wave $X_1$ or a square wave $X_2$. The line Y of FIG. 5 shows the output current pulse wave produced by the flipping magnetic domains proximate to receiving coil 29 when conductive element 22 is not under stress. There is a discrete time interval $T_o$ between when the electric current pulses $X_1$ or $X_2$ of the top lines initiate the magnetic pulses and when the flipping domains in element 22 cause the output current pulse within receiving coil 29, as shown by the centerline Y. The bottom line Z of FIG. 5 shows the effect of strain within the conductive element 22 and illustrates the increase in the discrete time interval to $T_1$ between when the electric current pulses in pulse coil 26 couples enough magnetic force to flip the magnetic domains within conductive element 22 and induce a current pulse within 20 receiving coil 29. The time differential $\Delta T$ between $T_o$ and $T_1$, as shown by the differences between the pulses on the line Y and the bottom line Z, is used as the measurement of the strain within the conductive element 22, and hence $\Delta T$ can be used to determine the strain within substrate 11 to which the conductive element 22 is attached.

Figure 6:
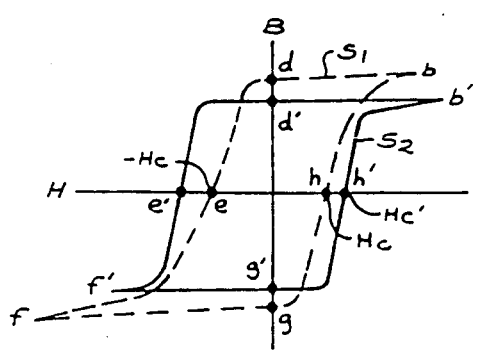
FIG. 6 is a hysteresis curve for a ferromagnetic metal showing the effect of applied stress.

The change in magnetization force (H) which is required to initiate the domain reversals in conductive element 22 may best be understood with reference to the microscopic properties of ferromagnetic materials, and the magnetic hysteresis curves as shown in FIG. 6, wherein the H axis represents the magnetizing force and the B axis represents the flux density. B and H are further related to the internal magnetization M of the material by the relation $\bar{B} = \bar{H} + 4\bar{M}\pi$. Within ferromagnetic materials, (also sometimes referred to as simply, magnetic materials), there is a coupling between the internal magnetization of the material (a vector quantity) and the mechanical state of the material, which reflects, inter alia, any stresses applied to the material. A variety of associated phenomena are known as magnetoelastic effects. Among the most important of these phenomena is magnetostriction. If the magnetization direction within a magnetic sample is changed, then the sample undergoes changes in its physical dimensions. For example, if a magnetic material is taken from an initial state, in which its magnetization is randomly distributed, to a final state, in which its magnetization is entirely directed along a given direction, then the sample's length along that direction changes by a fractional amount known as the saturation magnetostriction ($\lambda_s$). The value of $\lambda_s$ can be either positive or negative; typical magnitudes of $\lambda_s$ for the transition metals (Fe, Ni, and Co) are of the order $-10$ to 50 parts per million (ppm); for rare earth transition metal alloys, $\lambda_s$ can be as large as 2000 ppm. $\lambda_s$ provides a measure of the strength of the magnetoelastic coupling.

For materials having non-zero values of $\lambda_s$, the application of a uniaxial stress $\sigma$ gives rise to a magnetoelastic anisotropy energy per unit volume $K_s\sigma\lambda_s \cos^2\theta$, where $\theta$ is the angle between the axis of the stress and the magnetization direction. The final direction of the magnetization direction is determined by an energy balance among the various sources of magnetic anisotropy and the dipolar energy $\bar{M}\cdot\bar{H}$, where $\bar{H}$ is the applied magnetic field and $\bar{M}$ is the magnetization. In addition to magnetoelastic anisotropy, there are other sources of anisotropy: magnetocrystalline anisotropy, shape anisotropy, and field-induced anisotropy. For materials having $\lambda_s > 0$ which are placed in tension, the magnetoelastic anisotropy contribution makes it energetically favorable for the magnetization to align with the tensile axis. For application in magnetic domain strain gages, the greatest linearity is presumed to be achieved by selection of materials in which the magnetoelastic contribution to the total anisotropy energy dominates the contributions from the magnetocrystalline and field-induced anisotropy energies. For sensitivity at low strain levels, it is preferred that the magnetic material has a low magnetocrystalline and field-induced anisotropy. This requirement is normally satisfied by so-called soft magnetic materials, i.e. those having low values of magnetic coercive field $H_c$.

It is thus believed by the inventors that suitable magnetic materials for the present invention are soft magnetic materials which are magnetostrictive, preferably those having $\lambda_s > 10$ ppm. A preferred class of magnetic materials to be employed in the present invention is the class of magnetic amorphous metals, which are also known as glassy metals or metallic glasses. Such materials exhibit metallic electrical and thermal conductivity, and x-ray diffraction patterns like those of oxide glasses, having broad halos instead of the sharp peaks seen in crystalline materials. Among the magnetic amorphous metals are materials having the general formulas $M_aY_bZ_c$ and $M_dY_e$, which are disclosed by U.S. Pat. No. 3,856,513 issued to Chen et al. A variety of techniques are known in the art for producing these materials in the form of wires, ribbons, and thin films. In general, the materials are formed by rapidly quenching the alloy from the melt at rates of at least $10^{4o}$C/s, and more preferably, of at least $10^{6o}$C/s. Alternatively, the materials are formed by atomistic deposition processes such as evaporation and sputtering.

Ferromagnetic amorphous metals exhibit a desirable combination of negligible magnetocrystalline anisotropy, low magnetic coercivity, and high hardness and tensile strength. The high strength and hardness are especially valuable for the present application. Most conventional crystalline soft magnetic materials which have low anisotropy also have low hardness and tensile strength. They are thus prone to plastic deformation at comparatively low strain levels. In contrast, many amorphous materials show a reversible stress-strain behavior at up to 100 ksi stress. Suitable amorphous materials are thus useful for application in strain gages requiring a stable, reproducible zero strain state and high upper strain limit.

A ferromagnet is composed of an assemblage of spontaneously magnetized regions called domains. Within each domain, the elementary atomic magnetic moments are essentially aligned resulting in each domain acting as a small magnet. An unmagnetized foil of ferromagnetic material is composed of numerous domains oriented so that the total magnetization is zero. The process of magnetization under an applied field H, consists of growth of those domains oriented most nearly with the direction of the applied field H, at the expense of other domains which are randomly aligned, followed by rotation of the direction of magnetization within the non-aligned domains against anistropy forces. On removal of the applied field H, some magnetization will remain. Under an applied magnetizing force H, domain growth proceeds by movement of the Bloch wall between domains. This takes place reversibly at first, then irreversibly, until the magnetic coercive force is reached. The irreversible nature of magnetization results in the demagnetization under an applied $-H$ field to not retrace the magnetization path. Under the influence of a strong demagnetizing field $-H$, the magnetic orientations of the domains may be made to rapidly change alignment, i.e. to flip into alignment with the $-H$ field. There is a tendency for the magnetization hysteresis, that is, to lag behind the applied field which, when plotted graphically, results in a hysteresis loop as shown in FIG. 6.

The magnetic domain strain gage provides an apparatus for measuring the time required to flip the alignment of the magnetic domains, i.e. to measure the lag time or the increase in magnetization energy.

The magnetic domain strain gage may be operated at very high temperatures since the magnetic properties of ferromagnetic materials are relatively stable up to the Curie temperature $T_c$, (where a ferromagnet changes into a paramagnet). Thus, the present invention may be used at temperatures approaching the Curie temperature. By way of example, the Curie temperature of iron is 1043° K. (1418° F.).

The hysteresis curves of FIG. 6 are shown as representing the magnetic hysteresis loop for ferromagnetic material. In the case of an amorphous iron-based alloy the hysteresis loop is characterized as having a steep slope at the intersection of the H axis. The curve indicated by S1, i.e. bdefghb is an example of the hysteresis loop for an amorphous metal which is not under any stress or strain, and which for example, would produce the output pulse as illustrated by the centerline Y of FIG. 5. Curve S2 i.e. b'd'e'f'g'h'b' shows a hysteresis loop for the same amorphous iron-based alloy iron when a strain is applied to the alloy, and which would produce the output pulse illustrated by the bottom line Z of FIG. 5. Since the highest slopes on the B-H loop exist at the intersection of the H axis, it is at this point that $dB/dt$, which is proportional to the induced voltage, is maximum, causing the sharp output pulse produced within the receiving coil 29.

Strain causes a change in the shape of the walls of the magnetic domains, which results in a distortion of the hysteresis loop under an applied strain. This distortion causes an increase in the width of the hysteresis loop with reference to the H axis, and a decrease in the height along the B axis. Within the hysteresis loops, for curve S1, $H_c$ and for curve S2, $H_c'$, represent the magnetizing force at the positive crossing point for curves S1 and S2 on the H axis. The changes between curve S1 and S2 as a function of applied stress or strain is related to the change in magnetization force required to produce a change in the flux density B in conductive element 22 when conductive element 22 is under a no-load condition and when conductive element 22 is subjected to a stress load. This generally is the phenomena upon which the magnetic domain strain gages shown in FIGS. 2, 3 and 4 of the present invention are based.

The electric pulse generated by pulse generator 16 of FIG. 2 or pulse and current generator 17 of FIG. 3 is of sufficient magnitude to cause a magnetic pulse having a field strength which will saturate the magnetic domains within conductive element 22. It is presently believed that all of the magnetic domains in the conductive element 22 tend to orientate or flip simultaneously, with only small local variations. Increasing the stress within conductive element 22 increases the field strength (H) required to flip or realign the magnetic domains in the direction of H. This realignment must follow the hysteresis loop, which as has been described changes with an applied stress or strain, the time required for the magnetic domains to flip is directly linked to the distortion of the hysteresis loop since H is coupled to conductive element 22 as a function of time. In effect the magnetic domain strain gage measures the increase in time necessary to supply the additional magnetizing force to produce a maximum percentage of magnetic domain realignments.

Fatigue within conductive element 22 causes a permanent distortion of the walls of the magnetic domains, and thus a permanent distortion of the hysteresis loop. Fatigue may be measured by placing a magnetic domain fatigue gage identical to the strain gage of FIG. 2 or 3, upon a substrate, calibrating the B-H loop characteristic of the fatigue gage, subjecting the substrate and fatigue gage to cyclic stress thereby fatiguing the substrate, and measuring the change in the B-H loop characteristic of the fatigue gage. The fatigue state of the fatigue gage may be directly determined and the fatigue state of the substrate may thereby be inferred. This process provides for fatigue measurement within a component which in operation may be subjected to highly cyclic stresses in a harsh environment which is not condusive to the monitoring of the fatigue state of the component. Thus, for example, the fatigue gage of the present invention may be attached to a turbine blade within a turbine engine and then the turbine blade may be operated within the engine for a period of time. Subsequently, by measuring the change in the BH loop characteristic of the fatigue gage, the fatigue state of the turbine blade may be determined. The stability of the magnetic properties of ferromagnetic materials up to their Curie Temperature is particularly relevant in this example in that the turbine blade may be exposed to extremely high temperatures. As long as the Curie Temperature of the ferromagnetic material has not been exceeded, the magnetic domain walls will not be destroyed with the exception of the distortion of the magnetic domain walls caused by fatigue. Thus, the magnetic domain fatigue gage provides a very reliable measure of fatigue within elements which would normally not be easily evaluated.

It may be appreciated that although the square wave electric current pulse (FIG. 5 line $X^2$) is driven between a positive and a negative state at a regular interval, the timing of the current pulse induced within receiving coil 29 is somewhat dependent on the magnetic properties of the ferromagnetic material used for conductive element 22 and whether the magnetic pulse is going in a positive or negative direction. Thus, there may be a time difference between when the positive $T_o$ pulse and the negative $T_o$ pulse is received. Again referring to FIG. 6 with reference to curve S1, wherein $H_c$ *represents the positive crossing of the H axis and* $-H_c$ represents the negative crossing of the H axis, the absolute value of $H_c$ and of $-H_c$ may or may not be equivalent. In certain types of amorphous metals it may appear that the absolute values of $H_c$ and of $-H_c$ are not equivalent. The apparent difference arises from a bias field, such as can be caused by the earths magnetic field or a drive circuit having a DC offset. Under these circumstances, the positive and negative current pulses produced within the receiving coils 29 will not occur at an equal time interval following the initiation of the magnetic pulse.

Figure 7:
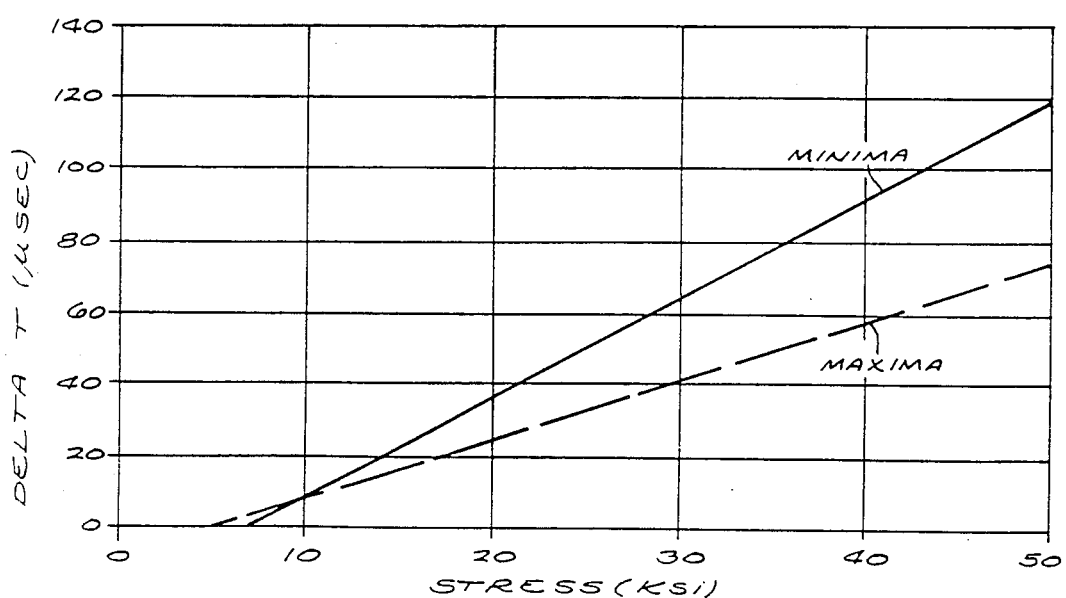
FIG. 7 is a graph showing stress as a function of the change in flip time of the magnetic domains for the magnetic domain strain gage of FIGS. 2 or 3.

FIG. 7 is a graph showing stress (ksi) vs. $\Delta T$ in microseconds for a test apparatus. In the test apparatus, the conductive element 22 had to be placed under a reference stress, $T_o$ was set at the reference stress resulting in the offset along the X axis. The two lines, labeled maxima and minima, represent measurements taken from respectively, the positive pulses of FIG. 5 for maxima and the negative pulses of FIG. 5 for the minima. These two lines illustrate the case of an amorphous metal in which the absolute values of $H_c$ and of $-H_c$ are not equivalent, as described above. As illustrated graphically in FIG. 7, the stress vs. time plot is a straight line.

Figure 8:
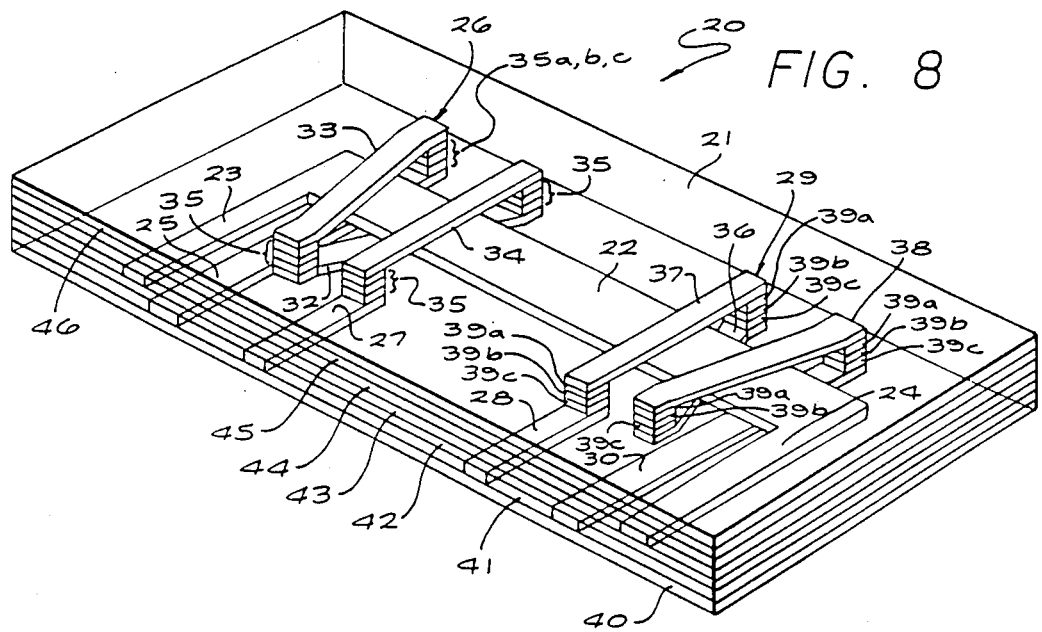
FIG. 8 is a detailed view of the magnetic domain strain gage of FIG. 2.

FIG. 8 shows a detailed view of the preferred embodiment of the strain gage 20 of FIG. 2. FIG. 8 illustrates the conductive element 22 as well as wire leads 23 and 24, pulse coil 26, pulse coil leads 25, 27, and receiving coil 29 embedded within an insulating carrier 21, for fabrication directly upon a substrate. Pulse coil 26 is made up of first, second and third pulse coil segments 32, 33, 34 and pulse coil post elements 35 a,b,c. Receiving coil 29 is made up of first, second, and third receiving coil segments 36, 37, 38 and receiving coil post elements 39 a,b,c. The conductive element 22 is shown as a layer of ferromagnetic material embedded within the insulating carrier 21. The conductive element 22 is formed from ferromagnetic material and is preferably an amorphous iron based alloy such as $Fe_{78} B_{13} Si_9$ (subscripts in atom percent). It may be appreciated that the magnetic domain strain gage 20 of FIG. 8 can be made relatively thin, on the order of, for example: 0.4 millimeters. It is also contemplated that the entire magnetic domain strain gage 20 could be miniaturized, down to the scale wherein the conductive element 22 is only a few magnetic domains in length.

Figure 9:
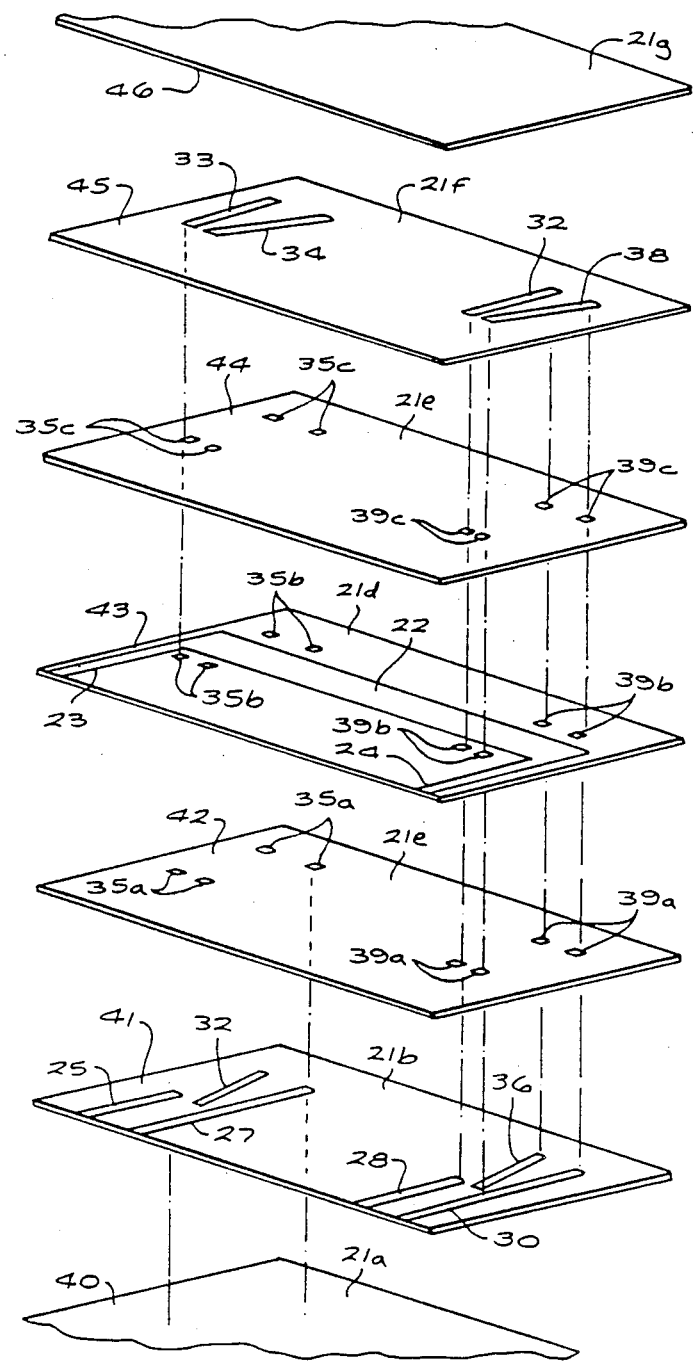
FIG. 9 is an exploded partial view illustrating the process of forming the magnetic domain strain gage of FIG. 8.

FIG. 9 is an exploded view illustrating the process of fabricating the magnetic domain strain gage 20 of FIG. 8. By this process, a first layer 40 of insulating material is applied directly upon the substrate. A second layer 41, having pulse coil leads 25, 27, receiving coil leads 28, 30, first pulse coil segment 32, and first receiving coil segment 36 within an insulating carrier 21, is then applied on top of first layer 40. A third layer 42, including insulating material and pulse coil post elements 35a as well as receiving coil post elements 39a is then applied atop of the second layer 41. The pulse coil post elements 35a within the third layer 4 align with the ends of pulse coil leads 25 and 27, as well as with opposite ends of first pulse coil segment 32. Similarly, receiving coil post elements 39a align with the ends of receiving coil leads 28 and 30, as well as with the ends of the first receiving coil segment 36. A fourth layer 43 is then applied atop of the third layer 42. The fourth layer 43 includes wire leads 23 and 24, as well as conductive element 22. Additionally, the fourth layer 43 includes pulse coil post elements 35b which are aligned with pulse coil post elements 35a of the third layer 42, as well as receiving coil post elements 39b which are also similarly aligned with receiving coil post elements 39a of the third layer 42. The wire leads 23, 24 and conductive element 22, as well as the pulse coil post elements 35b and receiving coil post elements 39b are all carried within the insulating material. A fifth layer 44 is then applied atop of the fourth layer 43. The fifth layer 44 includes pulse coil post elements 35c which are aligned with the pulse coil post elements 35b of the fourth layer 43, fifth layer 44 also includes receiving coil post elements 39c which are aligned with receiving coil post elements 39b of fourth layer 43. The fifth layer 44 also includes the insulating material surrounding the pulse coil post elements 35c and receiving coil post elements 39c. A sixth layer 45 is then applied atop of the fifth layer 44. The sixth layer 45, includes second pulse coil segment 33, third pulse coil segment 34, second receiving coil segment 37 and third receiving coil segment 38, all carried within the insulating material. A first end of second pulse coil segment 33 is vertically aligned with one end of the pulse coil lead 25 of the second layer 41, while the opposite end of second pulse coil segment 33 is vertically aligned with one end of the first pulse coil segment 32 within the second layer 41. The opposite end of first pulse coil segment 32 within second layer 41 is vertically aligned with a first end of third pulse coil segment 34 within the sixth layer 45, the other end of third pulse coil segment 34 being vertically aligned with one end of pulse coil lead 27. The pulse coil post elements 35 a,b,c provide the vertical conducting path between the second layer 41 and the sixth layer 45. Similarly, a first end of second receiving coil segment 37 within the sixth layer 45 is vertically aligned with one end of receiving coil lead 28 within second layer 41, while the other end of second receiving coil segment 37 is vertically aligned with a first end of first receiving coil segment 36. The other end of first receiving coil segment 36 is vertically aligned with one end of the third receiving coil segment 38, while the other end of the third receiving coil segment 38 is vertically aligned with one end of receiving coil lead 30 within the second layer 41. The receiving coil post elements 39 a,b,c provide the conducting path between the second layer 41 and the sixth layer 45 for receiving coil 29. A seventh layer 46 is then applied on top of the sixth layer 45, the seventh layer 46 being completely formed from an insulating material.

In one embodiment of the invention, the first layer 40 and the seventh layer 46, as well as the insulation portions of the second through sixth layers 41-45, are formed of a radiation curable dielectric material. The first layer 40 may be formed by the process steps of:

(a) applying the first insulation layer of a radiation curable dielectric material to a given area of the substrate;

(b) exposing the first layer to a source of radiation to cure the dielectric material.

The second, third, fourth, fifth and six layers, 41-45 may preferably be formed by the process steps of:

(a) applying a layer of a radiation curable dielectric material atop the previously cured layer;

(b) placing a photomask defining the conductive elements adjacent to the surface of the layer of radiation curable dielectric material;

(c) exposing the photomask to a source of radiation and developing the photomask to expose those regions of the previously applied and cured layer where the conductive elements are to be formed;

(d) forming the conductive elements on the surface of the previous layer by plating, spraying, or deporting a metal coating onto those regions of the previous layer covered by the exposed layer of the curable dielectric material.

The seventh layer 46 can be applied in a process identical to the process for the first layer 40.

An alternative process for forming the present invention, wherein the first layer 40 and the seventh layer 46, as well as the insulation portions of the second through sixth layers 41-45, are formed from Aluminum Oxide ($Al_2O_3$) includes the process steps of:

(a) sputtering a thin film of $Al_3O_2$ to form the first layer;

(b) applying a sputtering mask and sputtering conductive material atop portions of the previous layer;

(c) sputtering a thin film of $Al_2O_3$ on top of the previous layer;

d) applying an etching mask and etching portions of the thin film of $Al_2O_3$ where necessary;

(e) repeating steps b, c, and d utilizing different sputtering and etching masks to form the third layer;

(f) repeat step e to form the fourth layer;

(g) repeat step e to form the fifth layer;
(h) repeat step e to form the sixth layer;
(i) repeat step a to form the seventh layer.

Although several embodiments and examples of the present invention have been detailed hereinabove, it will be apparent to those skilled in the art that the invention is capable of a variety of alternative embodiments and applications. Accordingly, the invention is not to be construed as being limited to the above embodiments and examples, but only by the scope of the following claims.

What is claimed is:

1. A strain gage comprising:
   a first layer of insulating material;
   a second layer applied to said first layer, said second layer having an input lead, an output lead, a first traversing element, and an insulating carrier;
   a third layer applied to said second layer, said third layer having conductive first post elements aligned with the ends of said first traversing element and the ends of said input lead and said output lead within said second layer, said third layer also including an insulating carrier;
   a fourth layer applied to said third layer, said fourth layer having second post segments aligned with said first post segments of said third layer, said fourth layer including a ferromagnetic element and wire leads attached to the ends of said ferromagnetic element, said fourth layer including an insulating carrier;
   a fifth layer applied to said fourth layer, said fifth layer having third post segments aligned with said second post segments of said fourth layer, said fifth layer including an insulating carrier;
   a sixth layer applied to said fifth layer, said sixth layer having a second traversing element, and a third traversing element, a first end of said second traversing element being aligned with said end of said input lead of said second layer, a second end of said second traversing element aligned with one end of said first traversing element within said second layer, a first end of said third traversing element aligned with the other end of said first traversing element within said second layer, and a second end of said third traversing element aligned with said end of said output lead within said second layer, said sixth layer including an insulating carrier; and
   a seventh layer of insulating material applied to said sixth layer.

2. The strain gage of claim 1, wherein said insulating carrier is formed from a radiation curable dielectric material.

3. The strain gage of claim 1, wherein said insulating carrier is formed from aluminum oxide.

4. The strain gage of claim 1, wherein said input wire, said output wire, said first, second and third traversing elements and said post elements are depositable conductors capable of being formed by a process selected from the group including plating, spraying, and deporting.

5. The strain gage of claim 1, wherein said ferromagnetic element is a depositable conductor capable of being formed by a process selected from the group including plating, spraying, and deporting.

6. A method of forming a magnetic domain gage having a plurality of layers comprising the process steps of:
   applying a first insulation layer to a substrate;
   applying a second, third, fourth, fifth, and sixth layers on top of each proceeding layer by forming conductive elements on the surface of said preceeding layer and surrounding said conductive elements with insulation material; and
   applying a seventh layer of insulaton material on top of said sixth layer.

7. A method of forming a magnetic domain gage having a plurality of layers comprising the process steps of:
   applying a first layer of insulating material to a substrate;
   applying a second layer onto said first layer, said second layer having an input lead, and output lead, a first traversing element, and an insulating carrier;
   applying a third layer onto said second layer, said third layer having conductive first post elements aligned with the ends of said first traversing element and the ends of said input lead and said output lead within said second layer, said third layer also including an insulating carrier;
   applying a fourth layer onto said third layer, said fourth layer having second post segments aligned with said first post segments of said third layer, said fourth layer including a ferromagnetic element and wire leads attached to the ends of said ferromagnetic element, said fourth layer including an insulating carrier;
   applying a fifth layer onto said fourth layer, said fifth layer having third post segments aligned with said second post segments of said fourth layer, said fifth layer including an insulating carrier;
   applying a sixth layer onto said fifth layer, said sixth layer having a second traversing element, and a third traversing element, a first end of said second traversing element being aligned with said end of said input lead of said second layer, a second end of said second traversing element aligned with one end of said first traversing element within said second layer, a first end of said third traversing element aligned with the other end of said first traversing element within said second layer, and a second end of said third traversing element aligned with said end of said output lead within said second layer, said sixth layer including an insulating carrier; and
   applying a seventh layer of insulating material onto said sixth layer.

8. The method of forming the strain gage of claim 7, wherein said insulating carrier is formed by radiation curing a dielectric material.

9. The method of forming the strain gage of claim 7, wherein said insulating carrier is formed from aluminum oxide.

10. The method of forming the strain gage of claim 7, wherein said input wire, said output wire, said first, second and third traversing elements and said post elements are deposited conductors formed by a process selected from the group including plating, spraying, and deporting.

11. The method of forming the strain gage of claim 7, wherein said ferromagnetic element is a deposited conductor formed by a process selected from the group including plating, spraying, and deporting.

* * * * *